United States Patent [19]

Klüting et al.

[11] 4,141,583
[45] Feb. 27, 1979

[54] ACTUATOR FOR MOTOR-VEHICLE SEAT ADJUSTER

[75] Inventors: Bernd Klüting, Radevormwald; Hans W. Voss, Wuppertal, both of Fed. Rep. of Germany

[73] Assignee: Keiper Automobiltechnik GmbH & Co. KG., Remscheid-Hasten, Fed. Rep. of Germany

[21] Appl. No.: 854,749

[22] Filed: Nov. 25, 1977

[30] Foreign Application Priority Data

Nov. 26, 1976 [DE] Fed. Rep. of Germany ....... 2653680

[51] Int. Cl.² .............................................. B60N 1/02
[52] U.S. Cl. .................................. 296/65 R; 297/344
[58] Field of Search .............. 296/65 R, 63, 64, 65 A; 297/344

[56] References Cited

U.S. PATENT DOCUMENTS

| | | | |
|---|---|---|---|
| 2,982,235 | 5/1961 | Garvey | 296/65 R |
| 3,183,314 | 5/1965 | Pickles | 296/65 R |
| 3,223,791 | 12/1965 | Wanlass | 296/65 R |

Primary Examiner—Richard A. Bertsch
Attorney, Agent, or Firm—Michael J. Striker

[57] ABSTRACT

A motor-vehicle seat displaceable relative to a fixed support in a motor vehicle between a pair of end positions is powered by a motor whose output shaft may be rotatable in only a single predetermined rotational sense. Mechanism is provided having an input rotatable in one direction for displacing the seat on the support of the motor-vehicle from one end position into the other end position and rotatable in the other opposite direction for displacing the seat on the support from the other end position into the one end position. A motion-converting transmission is connected between the output shaft of the motor and the input of the displacement mechanism for automatically driving this input alternately in the one direction and in the other direction on continuous rotation of the motor output shaft in only the one sense. This motion-converting transmission may comprise a crank so that the motor-vehicle seat is automatically displaced from the one end position into the other and then back into the one position without the actuating motor having to stop.

10 Claims, 6 Drawing Figures

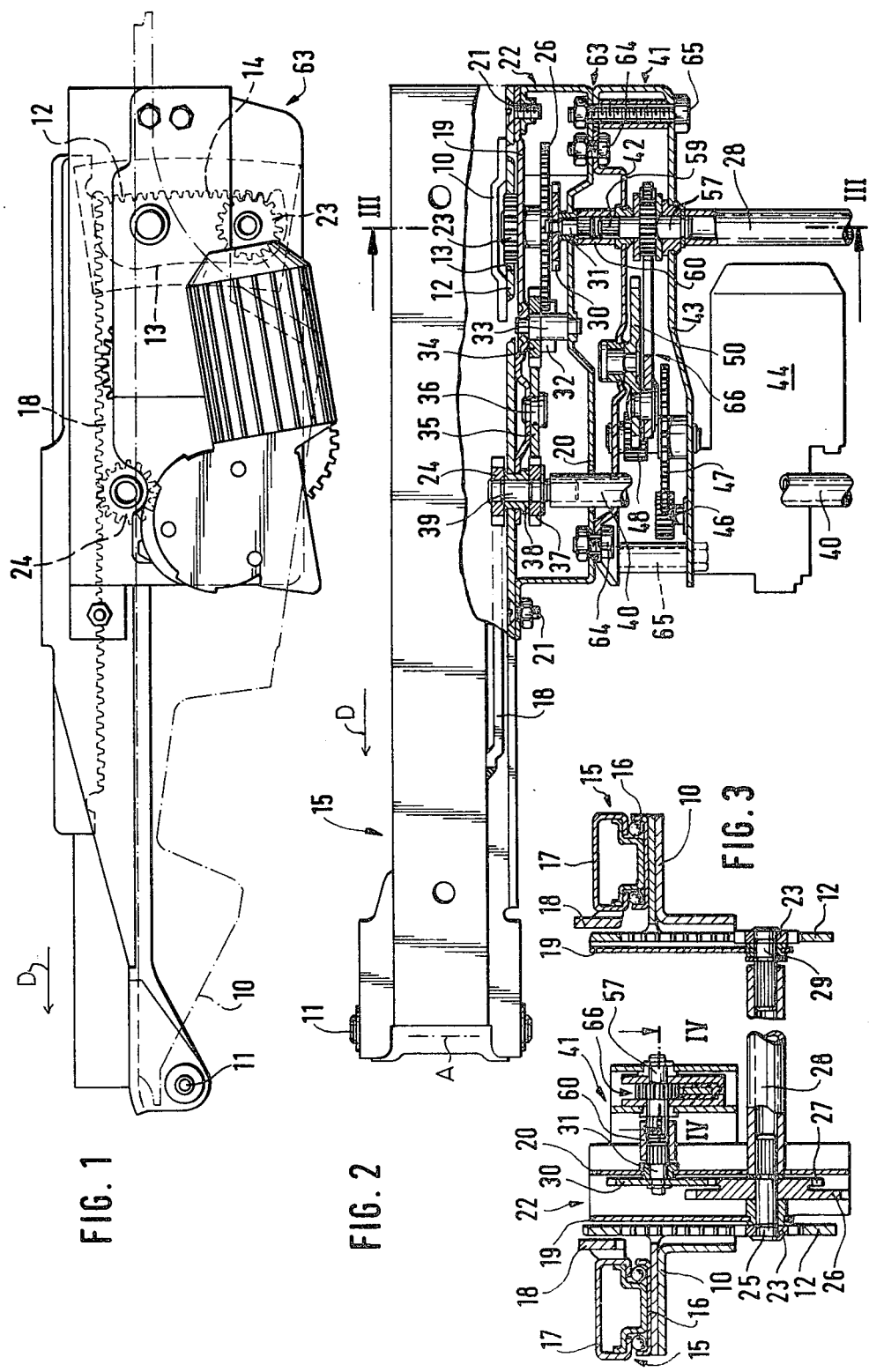

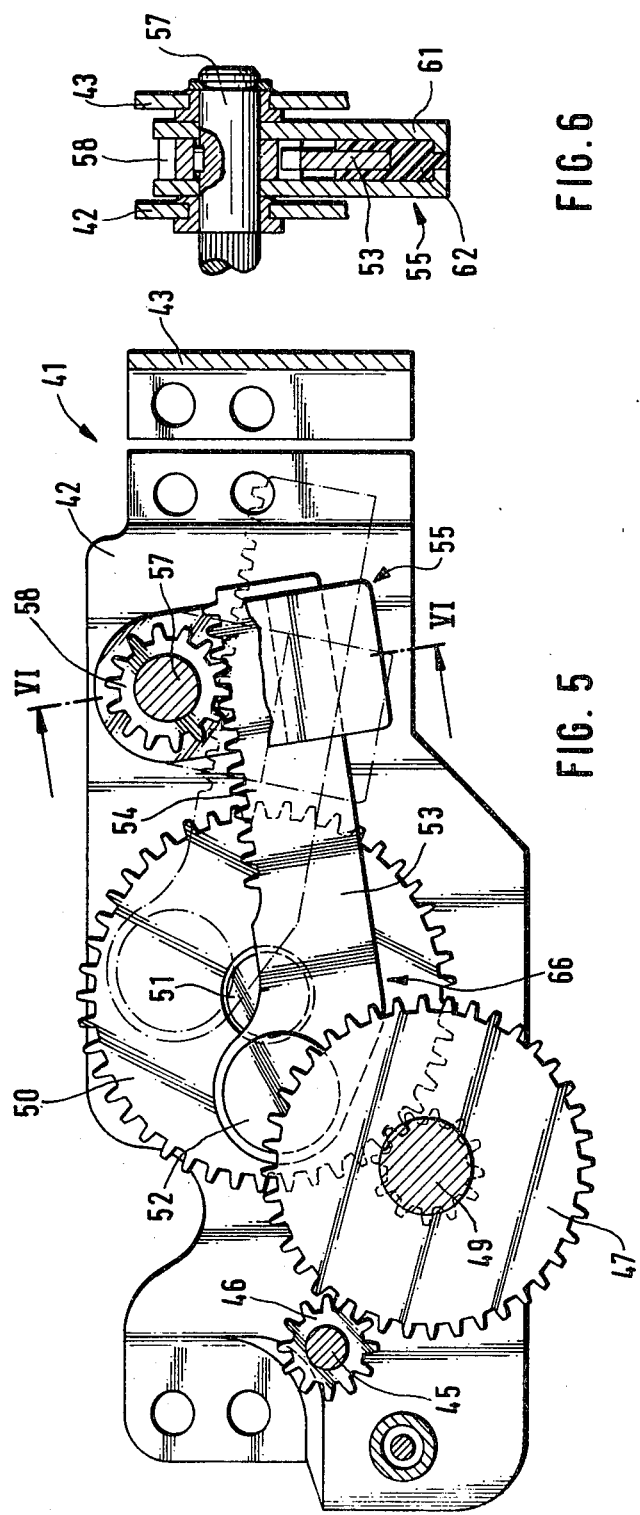

ACTUATOR FOR MOTOR-VEHICLE SEAT ADJUSTER

Cross-Reference to Related Application

This application is related to the commonly assigned and copending application Ser. No. 833,334 of A. Reinmoeller, whose entire disclosure is herewith incorporated by reference.

BACKGROUND OF THE INVENTION

The present invention relates to an actuator for a seat. More particularly this invention concerns an electrically powered adjuster for a motor-vehicle seat.

At least the driver's seat of a motor vehicle is usually displaceable horizontally relative to a support on the vehicle between a rear end position and a forward end position relative to the direction of travel to compensate for drivers of different height and to allow each drive to select that seat position most comfortable for him or her. It is also known to provide a tilting mechanism which automatically tilts the seat upwardly and forwardly as it is displaced from the rear end position toward the front end position, as typically the driver who likes his or her seat close to the wheel is relatively short and also likes the seat to be raised somewhat.

In the above-cited commonly owned patent application an arrangement is disclosed which automatically effects this horizontal displacement and tilting displacement synchronously. In this arrangement a reversible direct-current motor is operated by a reversing switch so that the user can merely push the switch in one direction to advance the seat in the corresponding direction and can push the switch in the opposite direction to similarly displace the seat in the opposite direction. The switch is normally not of the maintain type so that when released the motor is automatically deenergized and stops.

Nonetheless a problem with such an arrangement is that the switch is normally actuated for at least a limited period of time after the seat has reached an end position, as the user does not immediately ascertain that the seat has stopped moving so continues to hold the switch over for a short time. In order to prevent against overloading of the motor and the entire structure the electric motor is therefore normally provided with a thermal overload switch that automatically cuts the motor out when it heats up as a result of straining to displace the seat which can no longer move against an abutment defining an end position. It is also necessary in such an arrangement to overdimension the mechanism that displaces the seat between the rear and tilted-down end position and the forward and tilted-up position in order to insure that prior to automatic switching off of the motor by the thermal overload arrangement the mechanism is not damaged.

It has been suggested to overcome this problem by the provision of limit switches which automatically shut off or reverse the motor when it reaches an end position. Such an arrangement has proven itself so failure-prone in practice that it has never been used widely.

SUMMARY OF THE INVENTION

It is therefore an object of the present invention to provide an improved adjuster for a seat.

Another object is to provide an improved adjuster for a motor-vehicle seat displaceable relative to a fixed support in the motor vehicle between a pair of end positions.

A further object is the provision of such an actuator which can be produced at lower cost than the above-described type of actuator.

These objects are attained according to the present invention in a motor-vehicle seat of the above type wherein mechanism has an input rotatable in one direction for displacing the seat on the support from one of its end positions toward the other end position and in the other opposite direction for displacing the seat on the support from the other end position toward the one end position. According to this invention means is provided including a motion-converting transmission which is connected between the output of a motor that is rotatable in a predetermined rotational sense and the input of the displacement mechanism for driving this input alternately in the one direction and then in the other direction on continuous rotation of the output only in its predetermined rotational sense. According to this invention the motion-converting transmission automatically switches the input of the displacement mechanism between directions on displacement of the seat into the respective end position without stopping of rotation of the output of the motor in its predetermined rotational sense.

Thus in accordance with the instant invention the seat automatically moves into its one end position and then back toward the other end position if the switch for the actuating motor is held on. Thus it is possible to use an actuating motor which need only be unidirectional, and to provide a simple single-pole single-throw switch for operating such a motor. The mechanism that displaces the seat need not be overdimensioned, as it will never be forced to absorb all of the torque of the motor when the seat comes to its end positions. What is more it is possible to dispense with the thermal overload feature altogether, or to set it at a higher level so that it only operates when the seat becomes jammed due to external causes. Thus the entire arrangement according to this invention can be produced at much lower cost than the hitherto known actuator.

According to a further feature of this invention the motion-converting transmission includes an eccentric crank which is operatively connected to the output of the motor and a connecting rod which is connected to this crank and operatively connected to the input of the mechanism that displaces the seat. This connecting rod may be constituted as a rack that is continuously maintained in mesh with a pinion carried on an output shaft that in turn is connected to the input of the seat-displacement mechanism. A guide pivotal about the output shaft carrying this output pinion surrounds the connecting rod and is provided with a friction-reducing member on which the connecting rod can slide while in mesh with the output pinion.

The seat-displacement mechanism includes a support rail pivoted at its front end on the support of the seat and raisable at its rear end by means of a segment and pinion mechanism. A slide rail longitudinally slidable along this support rail is displaceable relative thereto by a rack and pinion which is operated jointly and synchronously with the segment and pinion. These two pinions are interconnected by a gear train contained in a mechanism housing bolted to the support rail. The transmission in turn is provided in a transmission housing that is bolted to the mechanism housing, and the motor itself is bolted to the transmission housing. Thus the entire assembly is supported on the support rail, and is pivotal therewith. With such an arrangement it is possible to do without a complex universal joint interconnecting a motor fixed to the motor-vehicle floor and the displacement mechanism. Of course the seat can comprise two such mechanisms having slide rails and the like, one for each side of the seat, in order to make the sliding of the seat as smooth as possible.

The novel features which are considered as characteristic for the invention are set forth in particular in the appended claims. The invention itself, however, both as to its construction and its method of operation, together with additional objects and advantages thereof, will be best understood from the following description of a specific embodiment when read in connection with the accompanying drawings.

BRIEF DESCRIPTION OF THE DRAWINGS

FIG. 1 is a partly sectional side view of a right-hand seat-displacement mechanism according to the instant invention;

FIG. 2 is a partly sectional and broken away top view of the structure of FIG. 1;

FIG. 3 is a section taken along line III—III through both sides of the displacement mechanism according to this invention;

FIG. 5 is a section taken along line V—V of FIG. 4; and

FIG. 6 is a section taken along line VI—VI of FIG. 5.

DESCRIPTION OF THE PREFERRED EMBODIMENT

Figure 4:
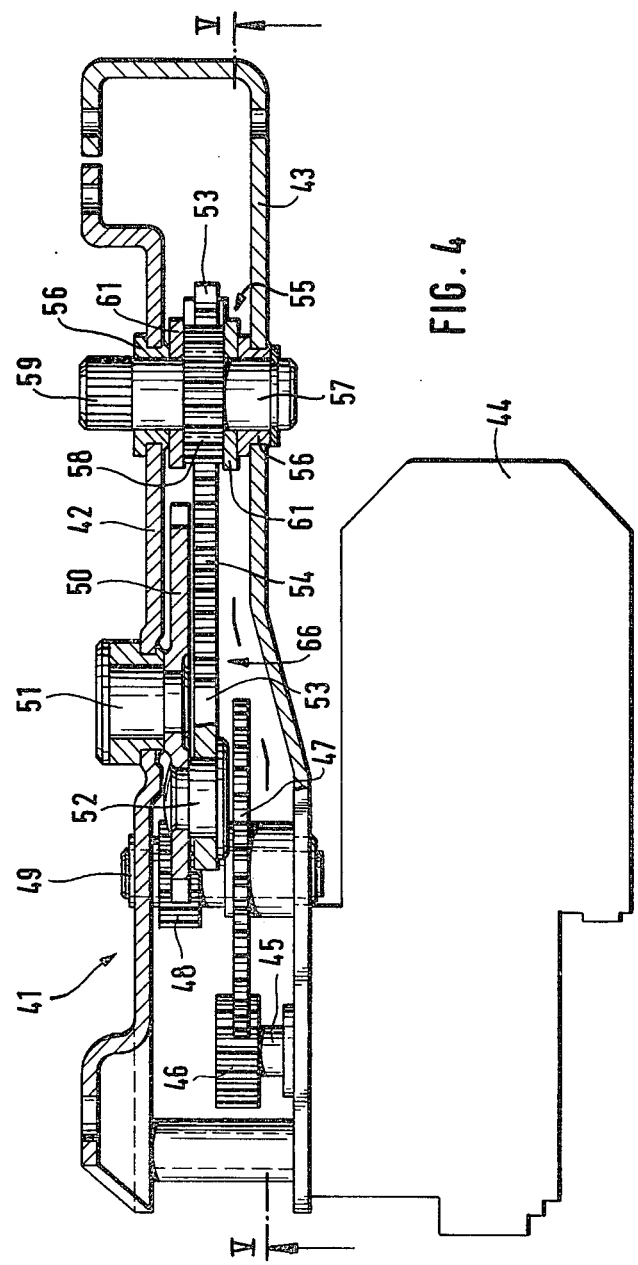
FIG. 4 is a large-scale section taken along line IV—IV of FIG. 3.

As shown in FIGS. 1-3 a motor vehicle normally displaceable in a horizontal direction D is provided with a support 10 provided relative to the direction D at its front end with a pivot 11 defining a horizontal axis A perpendicular to the direction D. At its rear end the fixed support 10 is provided with a rack member 12 having a throughgoing cut-out 13 and formed with a vertical array of teeth 14 forming a short gear segment.

The motor-vehicle seat is supported on each of its sides on a respective guide-rail assembly 15 each of which comprises a respective lower support rail 16 extending backwardly from and pivoted at its front end at the pivot 11 and an upper slide rail 17 displaceable by means of rollers parallel to and on top of the support rail 16. The motor-vehicle seat is bolted to the two upper slide rails 17 which can only move parallel to the lower rails 16 but cannot move in any other direction relative thereto. Each such slide rail 17 is provided with a rack 18 having downwardly directed teeth and fixed to each support rail 16 is a mounting plate 19.

A mechanism housing 20 is bolted by means of screws 21 to one of the plates 19, here the right-hand plate 19 relative to the direction D. This housing 20 contains displacement mechanism 22 including pinions 23 and 24 respectively in mesh with the segment 14 and rack 18. The pinion 23 is carried on a shaft 25 journalled in the mounting plate 19 and also carrying a small-diameter gear 26 and a large-diameter gear 27, all of the gears 24, 26 and 27 being angularly fixed for joint rotation. Splined on the shaft 25 is a connecting tube 28 that extends perpendicular to the direction D from the right-hand side of the seat actuating mechanism to the left-hand side where it is fitted over a splined shaft 29 journalled in the other mounting plate 19 and carrying a respective gear 23 meshing with the other segment 14. An intermediate gear 30 carried on a shaft 31 journalled in the housing 20 meshes with the small-diameter gear 27 and the large-diameter gear 26 meshes with a small-diameter gear 32 carried on a shaft 33 journalled in the mounting plate 19 and jointly rotatable with a large-diameter gear 34. An intermediate gear 35 carried on a further shaft 36 in the mounting plate 19 meshes on one side with the large-diameter gear 34 and on the other side with a gear 37 connected via a shaft 39 rotatable in a journal 38 in the plate 19 to the gear 24. Another connecting tube 40 is fitted over the shaft 39 for joint rotation of the gears 24 on both sides of the seat in mesh with the respective racks 18.

The above-described gear trains are so constructed that as the gears 23 rotate to raise the support rail 16 about the pivot 11 the gears 24 slide the rail 17 forwardly. When the rail 16 is in its uppermost position the rail 17 is in its frontmost position, and similarly when the rail 16 is in its lowermost position the rail 17 is in its rearmost position. This is achieved by appropriate dimensioning of the gears 23, 26, 32, 34, 35 and 24.

A motion-converting transmission 41 held in a housing formed by a pair of housing halves or plates 42 and 43 is secured by screws 64 to the housing 20. A direct-current electric motor 44 is in turn secured by means of screws 65 to the outer plate 43 of the housing 42, 43.

More particularly as shown in FIGS. 4–6 the mechanism 41 includes an input pinion 46 carried on the output shaft 45 of the motor 44. A large-diameter gear 47 carried on a shaft 49 on the plate 42 is unitary with a small-diameter gear 48 that in turn meshes with the teeth on the outer periphery of a large-diameter gear 50 carried on a shaft 51 fixed to the plate 42. This gear 50 carries offset from the axle 51 an eccentric crank 52 on which is mounted a connecting rod 53 formed along its upper edge as a rack 54. A guide 55 holds this rack 54 in mesh with the teeth of an output pinion 58 carried on a shaft 57 extending through the plate 42. Together the structure 50–57 constitutes a crank drive or mechanism 66 that converts continuous rotary motion of the gear 50 into oscillatory rotary motion of the gear 58 as will be described below.

This gear 58 is fixed on a shaft 57 having an end 59 coupled as shown in FIG. 2 via a tube 60 to the shaft 31 of the gear 30 that itself meshes as shown in FIG. 3 with the small-diameter gear 27 fixed on the shaft 25 of the one pinion 23.

Furthermore as shown in FIG. 6 the guide 55 is constituted as a split fork 61 embracing and surrounding the connecting rod 53 and provided in its interior with a synthetic-resin slide body 62 of polytetrafluoroethylene so that the connecting rod 53 can easily slide in the guide 55.

As mentioned above the synchronizing and actuating assembly 63 constituted by the mechanism 22 and transmission 41 need only be provided on one side of the seat, as the coupling tubes 28 and 40 insure that the pinions 23 and 24 rotate synchronously on the other side of the seat. Thus synchronous operation of the mechanisms on both sides of the seat is insured with minimal duplication of structure.

The transmission 41 is dimensioned according to this invention by appropriate dimensioning of the gears 46, 47, 48 and 50 as well as proper spacing of the axis of the eccentric 52 from the axis of the pin 51 so that for each full rotation of the large-diameter gear 50 the seat will move from its one end position into the other end position and then back into its original end position. Thus with the motor output shaft 45 rotating continuously in a single direction the connecting rod 54 will rotate the gear 58 in one direction during 180° of rotation of the gear 50, and during the next 180° of rotation of the gear 50 the connecting rod will rotate the gear 58 in the opposite direction. What is more the change in speed of displacement, that is the acceleration, of the seat as it moves from the one end position to the other will vary sinusoidally with the seat slowly moving into its rest position and slowly moving therefrom, but moving somewhat faster intermediate this rest position. Thus the seat will move to its one end and come to a sudden stop, but instead will slow down as it approaches its end position and then slowly accelerate in the opposite direction away from this end position during continuous steady-speed rotation of the output shaft 45. This type of adjustment makes for extremely comfortable use of the seat and allows the mechanism described above to be dimensioned relatively lightly as it will not be subject to considerable strain.

It will be understood that each of the elements described above, or two or more together, may also find a useful application in other types of mechanisms differing from the types described above.

While the invention has been illustrated and described as embodied in a motor-vehicle seat actuator, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An actuator for a seat displaceable relative to a fixed support between a pair of end positions, said actuator comprising:
   a motor having an output rotatable in a predetermined rotational sense;
   means including mechanism having an input rotatable in one direction for displacing said seat on said support from one of said end positions toward the other of said end positions and in the other opposite direction for displacing said seat on said support from said other end position toward said one end position; and
   means including a motion-converting transmission connected between said output of said motor and said input of said mechanism for driving said input alternately in said one direction and in said other direction on continuous rotation of said output only in said predetermined rotational sense.

2. The actuator defined in claim 1, wherein said motion-converting transmission switches said input between said directions on displacement of said seat into the respective end position without stopping of rotation of said output of said motor in said predetermined rotational sense.

3. The actuator defined in claim 2, wherein said transmission includes an eccentric crank operatively connected to said output of said motor and a connecting rod connected to said crank and operatively connected to said input of said mechanism.

4. The actuator defined in claim 3, wherein said mechanism includes first means for displacing said seat generally horizontally relative to said support and second means synchronously and jointly operable with said first means for tilting said seat about a generally horizontal axis on said support.

5. The actuator defined in claim 4, wherein said seat is a motor-vehicle seat normally displaceable horizontally in a predetermined vehicle direction of travel.

6. The actuator defined in claim 3, wherein said mechanism is provided with a respective mechanism housing secured to said seat and said transmission is provided to a respective transmission housing secured to said mechanism housing.

7. The actuator defined in claim 3, wherein said transmission has an input shaft positively connected to said output and carrying said crank and an output shaft connected to said input and carrying an output pinion, said connecting rod having a rack meshing with said output pinion, said transmission further comprising means for maintaining said rack permanently in mesh with said output pinion.

8. The actuator defined in claim 7, wherein said means for maintaining includes a guide pivoted about said output shaft and through which passes said connecting rod and a friction-reducing slide member engaging said connecting rod and facing said output pinion.

9. The actuator defined in claim 4, wherein said first means for displacing includes a support rail secured to said pivot and a slide rail slidable on said support rail and carrying said seat, said mechanism and sand transmission including at least one housing fixed to one of said rails.

10. The actuator defined in claim 3, wherein said transmission includes a housing and said motor is fixed to said housing.

* * * * *